United States Patent [19]

Shimizu et al.

[11] Patent Number: 4,868,026
[45] Date of Patent: Sep. 19, 1989

[54] MULTILAYERED CONTAINER AND PROCESS FOR PRODUCTION THEREOF

[75] Inventors: Senzo Shimizu, Odawara; Yoshiaki Momose, Hadano; Yozo Yoshida, Hiratsuka, all of Japan

[73] Assignee: Mitsubishi Gas Chemical Co., Inc., Tokyo, Japan

[21] Appl. No.: 230,233

[22] Filed: Aug. 9, 1988

[51] Int. Cl.$^4$ .................. B65D 23/00; B29C 49/06
[52] U.S. Cl. .................. 428/36.7; 215/1 C; 220/468; 264/537; 428/475.2
[58] Field of Search .......... 428/36.6, 36.7, 475.2; 215/1 C; 220/468; 264/537

[56] References Cited

U.S. PATENT DOCUMENTS

4,550,043  10/1985  Beck ............................ 428/36.7
4,728,549  3/1988   Shimizu et al. ............... 428/36.7

Primary Examiner—Robinson, Ellis P.
Assistant Examiner—James J. Seidleck
Attorney, Agent, or Firm—Wenderoth, Lind & Ponack

[57] ABSTRACT

A biaxially oriented blow-molded container composed of a thermoplastic gas-barrier resin (resin B) and a thermoplastic resin (resin A) other than resin B and having excellent gas-barrier property and delamination strength. The container comprises a substantially non-oriented mouth portion composed of resin A, a portion composed of two layers of resin A and one layer of resin B which are laminated with the resin A layer and the resin B layer occurring alternately and a portion composed of three layers of resin A and two layers of resin B which are laminated with the resin A layer and the resin B layer occurring alternately. A portion having a small radius of curvature where delamination tends to occur is formed in a three-layer structure. A process for producing the container is also provided.

7 Claims, 4 Drawing Sheets

MULTILAYERED CONTAINER AND PROCESS FOR PRODUCTION THEREOF

BACKGROUND OF THE INVENTION

1. Field of the Invention

This invention relates to a multilayered container having a multilayered structure, and more specifically, to a multilayered container having excellent delamination resistance, transparency, gas-barrier property an mechanical strength and a process for production thereof.

2. Description of the Prior Art

In recent years, hollow containers of thermoplastic resins have been widely used to hold cosmetics, foods and drinks because of their various advantages such as light weight and safety against bursting. In particular, the development of hollow containers composed of polyethylene terephthalate has rapidly advanced as a result of the improvement of the biaxial stretch-blow molding technique.

Biaxially oriented containers composed of a thermoplastic polyester resin, typically polyethylene terephthalate, do not have all the necessary properties. For example, they have insufficient gas-barrier property to oxygen and carbon dioxide gas, and will impair the flavor of foods and drinks requiring a high level of gas-barrier property.

In an attempt to eliminate this defect, a multilayered-container was proposed which is produced by injecting a thermoplastic polyester and a m-xylylene group-containing polyamide resin (MX nylon) as a gas-barrier thermoplastic resin in this sequence into a single mold from separate injection cylinders to form a three-layered parison composed of an inside and an outside layer of the thermoplastic polyester resin and an inside core layer of MX nylon, and biaxially blow-molding the parison (Japanese Laid-Open Patent Publications Nos. 128516/1982 and 128520/1982; and corresponding U.S. Pat. No. 4,335,901). If in this method, the amount of MX nylon injected is decreased in an attempt to decrease the thickness of the inside core layer, the inside core layer is formed only partly, and the resulting container has insufficient gas-barrier property.

The present inventors developed an improvement over this prior method in which three layers of the thermoplastic polyester resin and two layers of the MX nylon are laminated alternately to form a five-layer structure by injecting the thermoplastic polyester resin, MX nylon and again the thermoplastic polyester resin in this sequence, and consequently, the amount of the MX nylon injected can be decreased from that in the prior art although there are two layers of the MX nylon. This method was applied for a patent (Japanese Laid-Open Patent Publication No. 240409/1985 and corresponding U.S. patent application Ser. No. 731,953 and Japanese Laid-Open Patent Publication No. 108542/1986 and corresponding U.S. Pat. No. 4,728,549).

A method was also proposed in which the thickness of the inside core layer is decreased by first injecting the resin forming the inside and outside layers and then simultaneously injecting the resin forming the inside and outside layers and the resin forming the inside core layer (Japanese Patent Publication No. 16326/1985 corresponding to U.S. Pat. No. 4,174,413). In the resulting three-layer structure, the inside core layer is deviated toward either of the inside and outside layers.

Generally, thermoplastic gas-barrier resin (resin B hereinafter) including MX nylon have poor affinity for resins (resin A hereinafter) such as thermoplastic polyester resins, and the delamination resistance is weak. If a curved surface having a small radius of curvature exists in the rib portion of the container and that curved surface is stretched by the gas pressure of the contents, delamination between resin layers tends to occur at the stretched part. The delaminated part separates into two films, and the container looks slightly white to present an undesirable appearance. The present inventors extensively studied this problem, and finally found that when a curved surface having a radius of curvature of not more than 5 mm on the rib portion of the container is stretched by the gas pressure of the contents, delamination occurs with a high probability in a part composed of five resin layers, whereas it occurs with a very low probability in a part composed of three resin layers; and that the gas-barrier property of the same amount of the gas-barrier resin is better at the part composed of five layers containing two layers of the gas-barrier resin than at the part composed of three resin layers containing one layer of the gas-barrier resin. This finding has now led to the present invention.

SUMMARY OF THE INVENTION

It is an object of this invention to provide a blow-molded container free from delamination between resin layers.

Another object of this invention is to provide a blow-molded container having excellent gas-barrier property and mechanical property and being free from delamination.

Still another object of this invention is to provide a blow-molded container having excellent gas-barrier property and mechanical strength and being free from occurrence of delamination at a part having a radius of curvature of not more than 5 mm in the rib portion of the container.

A further object of this invention is to provide a blow-molded container which does not undergo delamination even after it is used for a long period of time as a container for holding potable water which require gas-barrier property to oxygen and/or carbon dioxide gas.

The objects of this invention are achieved by a biaxially oriented blow-molded container composed of a thermoplastic gas-barrier resin (resin B) and a thermoplastic resin (resin A) other than resin B; wherein the mouth portion is composed of resin A and substantially non-oriented, and the remainder consists of a portion composed of two layers of resin A and one layer of resin B which are laminated with the resin A layer and the resin B layer occurring alternately and a portion composed of three layers of resin A and two layers of resin B which are laminated with the resin A layer and the resin B layer occurring alternately.

DETAILED DESCRIPTION OF PREFERRED EMBODIMENTS

The present invention will be described by reference to the accompanying drawings.

Figure 1:
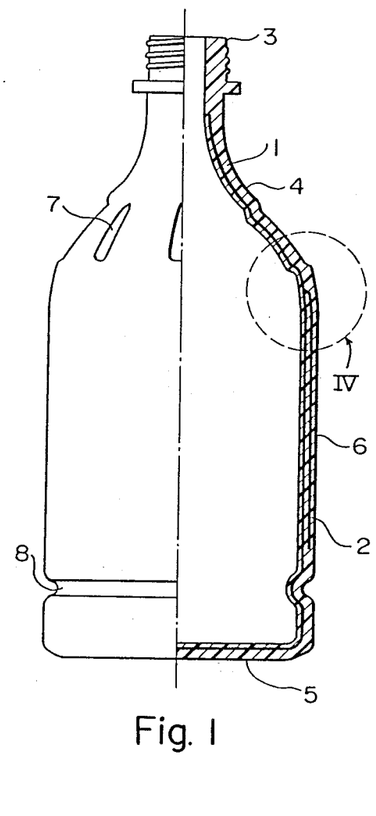
FIGS. 1, 2 and 3 are partly broken-away front views of examples of the blow-molded container of this invention.
Figure 2:
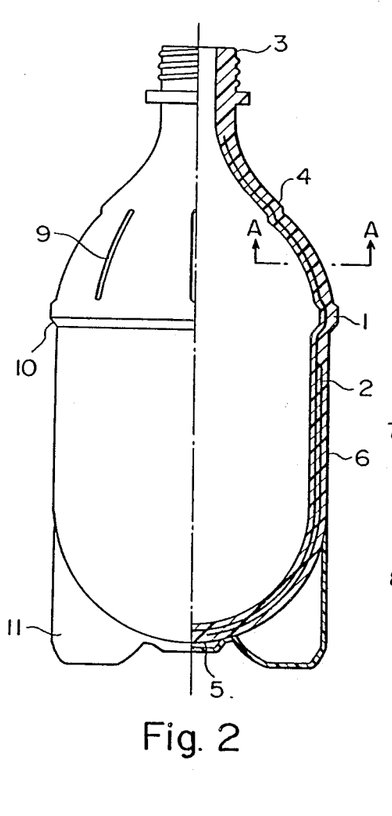
Figure 3:
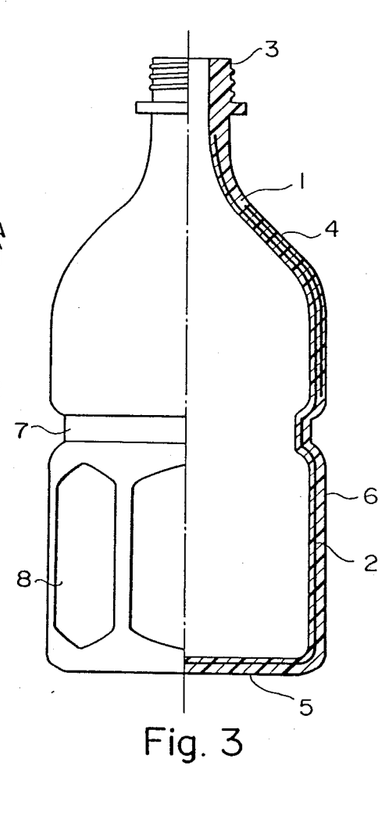

FIGS. 1, 2 and 3 are partly broken-away front views showing examples of the container of the invention. FIG. 1 shows a self-supporting stretch blow-molded bottle. FIG. 2 shows a base cup-equipped stretch blow-molded bottle. FIG. 3 is a self-supporting stretch blow-molded bottle having ribs existing at the lower part of its body portion.

Figure 4:
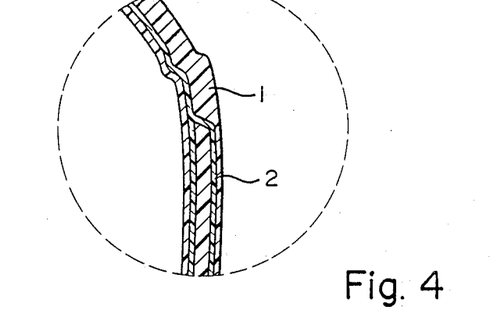
FIG. 4 is an enlarged view of a portion encircled in a broken line in FIG. 1.

In the example of FIG. 1, the bottle includes a vertical rib 7 as a site having a small radius of curvature at its shoulder portion 4 and a lateral rib 8 as a site having a small radius of curvature at its bottom portion 5. Hence, the shoulder portion 4 and the bottom portion 5 are each of a three layer structure composed of two layers of resin A and one layer of resin B, and the body portion 6 of the bottle is of a five-layer structure composed of three layers of resin A and two layers of resin B. FIG. 4 is an enlarged view of the circular part shown by a broken line in FIG. 1 presented in order to clearly show the resin B layer shown by a solid line in FIG. 1.

Figure 5:
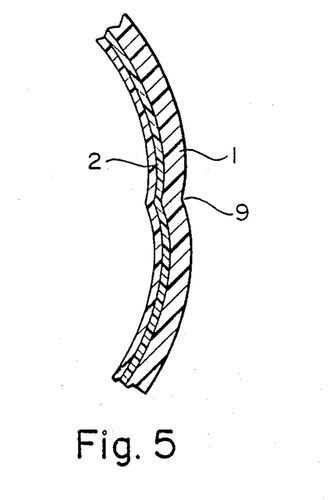
FIG. 5 is a sectional view taken on line A—A of FIG. 2.

In the example of FIG. 2, the bottle has a vertical rib 9 and a lateral rib 10 as sites having a small radius of curvature at its shoulder portion 4. Thus, the shoulder portion is of a three-layer structure composed of two layers of resin A and one layer of resin B, and the body portion 6 and the bottom portion 5 are each of a five-layer structure composed of three layers of resin A and two layers of resin B. In FIG. 5 which is an enlarged view taken along line A—A of FIG. 2, the left side is the inside of the bottle and the right side is the outside of the bottle.

In the example of FIG. 3, the bottle has a lateral rib 7 and a vertical rib 8 as sites having a small radius of curvature at its body portion 6. Hence, the shoulder portion 4 and the body portion 6 above the lateral rib 7 are of a five-layer structure composed of three layers of resin A and two layers of resin B, and the bottom portion below the lateral rib 7 is of a three-layer structure composed of two layers of resin A and one layer of resin B.

As shown in FIGS. 1 to 3, the opening end part 3 of the mouth portion of the bottle and its vicinity are substantially unstretched and composed of resin A. The reason for this is that since this part has a small surface area and a large thickness, it does not so much affect the gas-barrier property of the entire bottle, and that the gas-barrier resin (resin B) generally has high hygroscopicity, and when not oriented, absorbs water and becomes whitened to present an undesirable appearance.

Figure 6:
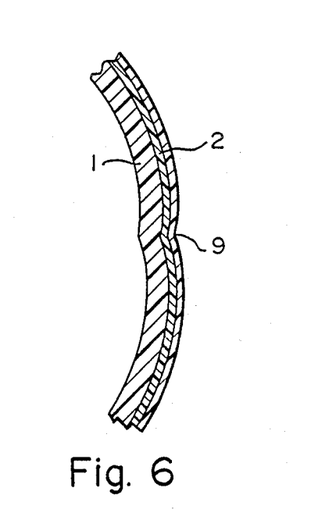
FIG. 6 is a sectional view, corresponding to FIG. 5, in which the resin B layer is located on the outside.

When the radius of curvature of the container becomes small and the resin layers of the bottle are stretched under internal pressures during use, an interlayer shear strain is generated and delamination of the resin layers tends to occur. The stretch blow-molded container from a parison is formed by introducing a high-pressure gas into a heated parison and inflating it from inside and pressing it against the mold. Hence, a bent part of the container has a sharp shape of a small radius of curvature faithfully following the shape of the mold as it is near the outside close to the mold. In FIG. 6 which is an enlarged view taken along line A—A in FIG. 2, the resin B layer is positioned close to the outside. Since the radius of curvature of the resin B in the the rib portion of the container is smaller than that of the resin B layer in FIG. 5, delamination tends to occur in comparison with the case of FIG. 6. Accordingly, it is preferred to position the resin B layer near the inside as in FIG. 5.

On the other hand, since the gas-barrier resin generally decreases abruptly in gas-barrier property as the humidity approaches 100%, it is preferred to position the gas-barrier resin layer (resin B layer) at a part near the outside which is remote from the contents. In the present invention, there are two gas-barrier layers in that portion of the container which is other than the sites having a small radius of curvature in the rib portion, and one of them is located near the outside. Accordingly, the reduction of the gas-barrier property is little.

As stated above, the blow-molded container of this invention comprises a substantially non-oriented portion of resin A including the opening end of the mouth portion of the container, and the remainder consisting of a portion composed of two layers of resin A and one layer of resin B alternately laminated and a portion composed of three layers of resin A and two layers of resin B. The container can be produced by producing a parison having the corresponding layer structure and then biaxially stretching and blow-molding the parison.

The method of producing the parison will be described.

Figure 7:
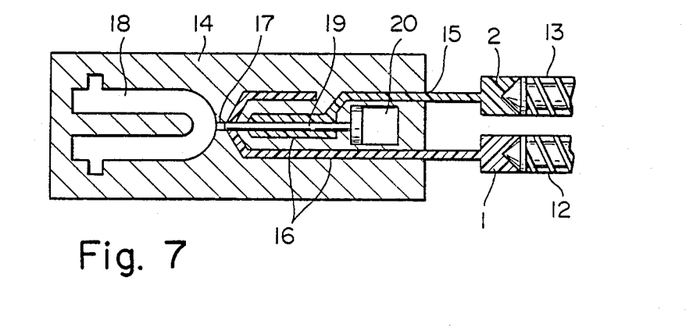
FIG. 7 is a schematic view of an example of an apparatus used to produce the parison in the present invention.

FIG. 7 is a schematic view showing a device for producing a parison which is a precursor of the container of the invention. This device is provided with a cylinder 12 for resin A (reference numeral 1) and a cylinder 13 for resin B (reference numeral 2) and are connected to a mold 14 at a nozzle portion 15. The resins A and B melted in the cylinders 12 and 13 respectively are injected simultaneously or alternately into a cavity 18 of the mold 14 via a hot runner portion 16 and a gate 17.

Figure 8:
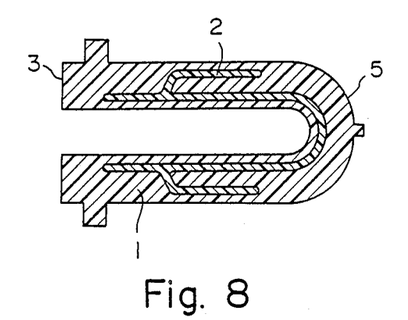
FIGS. 8 to 10 are sectional views of examples of the parison obtained by the present invention.
Figure 9:
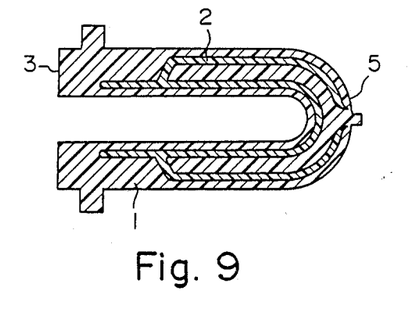
Figure 10:
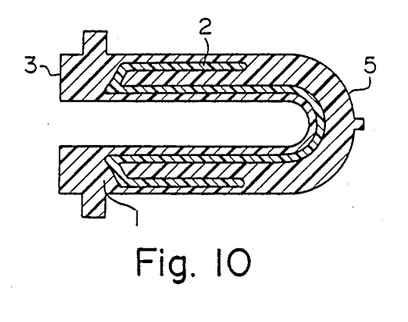
Figure 11:
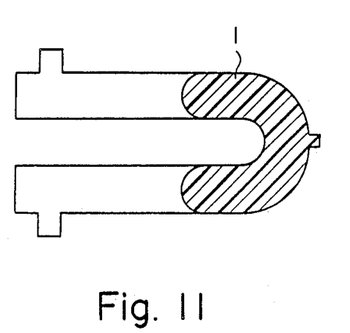
FIGS. 11 to 14 are sectional views showing the process of forming the parison shown in FIG. 8.
Figure 12:
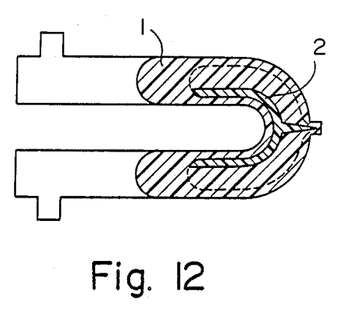
Figure 13:
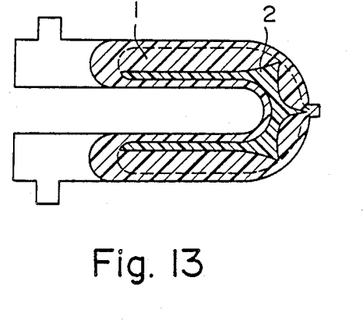
Figure 14:
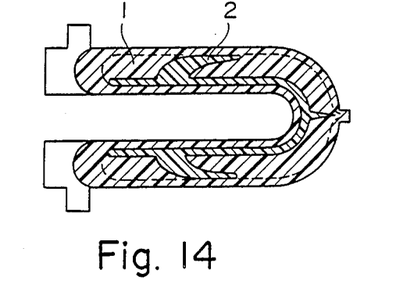

The parison as a precursor of the container of the invention is formed by properly combining simultaneous injection and alternate injection of the resins A and B using the above device. This combination differs depending upon the positions at which three layers and fives layers are formed. In the following description, typical examples shown in FIGS. 8 to 10 will be taken up. In the case of FIG. 8 in which three layers, five layers and three layers are formed from the opening end part of the mouth portion toward the bottom portion (3/5/3 layers); in the case of FIG. 9, three layers and five layers are formed from the opening end part of the mouth portion toward the bottom portion (3/5 layers); and in the case of FIG. 10, five layers and three layers are formed from the opening end part of the mouth portion toward the bottom portion (5/3 layers).

3/5/3 layers

A parison of the 3/5/3 layer structure is formed by the following procedure.

(1) The total amount of resin B to be injected is adjusted to 1 to 25% of the volume of the cavity.

(2) Only resin A is injected in an amount corresponding to 20 to 70% of the volume of the cavity (step I).

(3) Resin B in an amount 5 to 35% of the total amount of resin B to be injected and resin A in an amount 1.0 to 10 times the amount of resin B to be injected are simultaneously injected (step II).

(4) Resin B in an amount 30 to 90% of the total amount of resin B to be injected is injected either alone or together with resin A in an amount not more than two times the amount of resin B injected (step III).

(5) Resin B in an amount 5 to 35% of the total amount of resin B to be injected and resin A in an amount 1.0 to 10 times the amount of resin B injected are injected simultaneously (step IV).

(6) Finally, resin A alone is injected in an amount corresponding to 10 to 70% of the volume of the cavity to fill the cavity (step V).

By the above procedure, a parison can be formed.

3/5 layers

A parison of the 3/5 layer structure is formed by the following procedure.

(1) The total amount of resin B to be injected is adjusted to 1 to 25% of the volume of the cavity.

(2) Resin A alone is injected in an amount corresponding to 20 to 70% of the volume of the cavity (step I).

(3) Resin B in an amount 10 to 70% of the total amount of resin B to be injected and resin A in an amount 1.0 to 10 times the amount of resin B to be injected are simultaneously injected (step II).

(4) Resin B in an amount 30 to 90% of the total amount of resin B to be injected is injected either alone or together with resin A in an amount not more than two times the amount of resin B to be injected (step III).

(5) Finally, resin A alone is injected in an amount corresponding to 10 to 70% of the volume of the cavity to fill the cavity (step V).

This procedure leads to the formation of a parison.

5/3 layers

A parison of the 5/3 layer structure is formed by the following procedure.

(1) The total amount of resin B injected is adjusted to 1 to 25% of the volume of the cavity.

(2) Resin A alone is injected in an amount corresponding to 20 to 70% of the volume of the cavity (step I).

(3) Resin B in an amount corresponding to 30 to 90% of the total amount of resin B to be injected is injected either alone or together with resin A in an amount not more than 2 times the amount of resin B to be injected (step III).

(4) Resin B in an amount corresponding to 10 to 70% of the total amount of resin B injected and resin A in an amount 1.0 to 10 times the amount of resin B to be injected are injected simultaneously (step IV).

(5) Finally, resin A alone is injected in an amount corresponding to 10 to 70% of the volume of the cavity to fill the cavity (step V).

This procedure can form a parison.

Accordingly, if the amount of resin injected in step II in the formation of a parison of the 3/5/3 layer is increased and step IV is omitted, a parison of the 3/5 layer structure can be obtained. If step II in the formation of the parison of the 3/5/3 structure is omitted and the amount of resin B injected in step IV is increased, a parison of the 5/3 layer structure can be obtained.

Various conditions in the above procedures will be described in detail.

Figure 16:
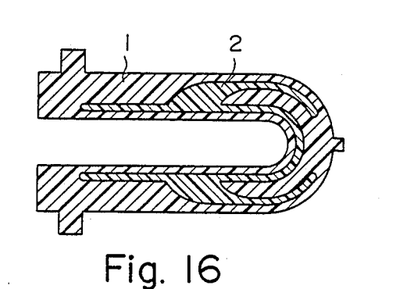
Figure 17:
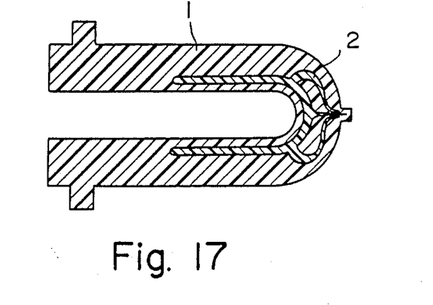

The total amount of resin B described in (1) in each of the procedures corresponds to 1 to 25%, preferably 5 to 10%, of the volume of the mold cavity. If it is less than 1%, a layer of resin B is difficult to form and the resulting layer is broken here and there. The effect of adding the resin B layer cannot be expected. If, on the other hand, it exceeds 25%, the resin B layer tends to be distributed deviatingly as shown in FIG. 16. In the deviated part, the boundary line between the resin A layer and the resin B layer becomes conspicuous and presents an undesirable appearance.

If the amount of resin A injected in step I is large, the resin B gathers at the bottom portion. If it is small, the resin B layer tends to stretch in the direction of the opening end of the mouth portion. Accordingly, the amount of resin A to be injected in step I is adjusted to 20 to 70%, preferably 40 to 60%, of the volume of the cavity.

In step II, resins A and B are injected simultaneously. The amount of resin B to be injected is 5 to 35%, preferably 10 to 25%, for the formation of the 3/5/3 layers, and 10 to 70%, preferably 20 to 50%, for the formation of the 3/5 layers, both based on the total amount of the resin B to be injected. The amount of resin A to be injected is 1.0 to 10 times, preferably 1.2 to 2 times, the amount of the resin B to be injected in step II. If the amount of resin A injected is more than this specified limit, the resin B layer becomes too thin. If it is less than the specified lower limit, the amount of resin B becomes too large and three layers cannot be formed. In such a case, disturbed five layers with outside thin resin B layers tend to form. In the formation of the 5/3 layers, step II does not exist.

Figure 15:
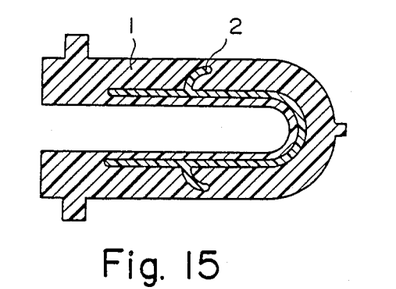
FIGS. 15 to 18 are sectional views showing examples of parisons formed under inappropriate conditions.

In step III, resin B in an amount corresponding to 30 to 90%, preferably 50 to 80%, of the total amount of resin B to be injected is injected either alone or together with resin A in an amount not more than 2 times, preferably 0.1 to 0.9 time, the amount of resin B to be injected in step III. If the amount of resin B injected exceeds 90%, it is difficult to form three layers. If it is less than 30%, the five-layer portion becomes small as shown in FIG. 15. When resin B alone is injected, two resin B layers in the five-layer portion have an equal thickness. When resin A and resin B are simultaneously injected, the resin B layer on the inside of the parison becomes thicker than the resin B layer near the outside of the parison as the amount of resin A injected simultaneously increases.

In step IV, resins A and B are simultaneously injected. The amount of resin B to be injected is 5 to 35%, preferably 10 to 25%, for the formation of the 3/5/3 layers, and 10 to 70%, preferably 20 to 50%, for the formation of the 5/3 layers, both based on the total amount of resin B to be injected. The amount of resin A to be injected is 1.0 to 10 times, preferably 1.2 to 2 times, the amount of resin B injected in step IV. If the amount of resin A injected exceeds the above specified limit, the resin B layers become too thin. If it is less than the specified limit, the amount of resin B becomes too large and three layers cannot be formed. Disturbed five layers with thin outside resin B layers tend to form. Step IV does not exist in the case of forming the 3/5 layers.

Figure 18:
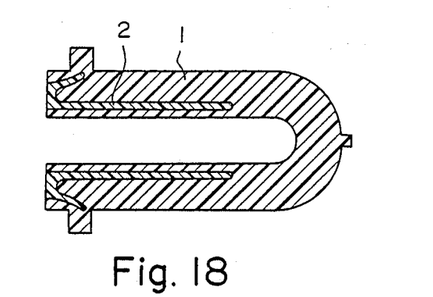

In step V, only resin A is injected in an amount corresponding to 10 to 70%, preferably 20 to 50%, of the volume of the cavity. If the amount of resin A injected is less than the specified limit, resin B near the gate cannot be completely replaced by resin A, and in the next injecting cycle, a mixture of resin A and resin B forms. If it is above the specified limit, the amount of resin A injected previously is so small that as shown in FIG. 18, the resin B layer is pushed out by resin A injected next and comes out on the surface at the opening end of the mouth portion. Consequently, troubles such as cracking and whitening by water absorption occur.

Generally, higher speeds of injecting the resins are preferred for shortening the cycle time and preventing whitening ascribed to crystallization. If the injection speed is too high, heat is generated owing to shearing and causes decomposition of the resins. This leads to various troubles such as the formation of volatile components, silver streak a reduction in the molecular weight which reduces strength. Preferably, the speed of injecting resin A is 1 to 15 cc/sec in each of steps I to IV, and 5 to 15 cc/sec in step V, and the speed of injecting resin B is preferably 5 to 70 cc/sec. The injecting speeds of simultaneously injecting resins A and B are determined by the ratio of the amounts of injection of resins A and B.

FIGS. 11 to 14 show the state of flow of the resins in the cavity which changes with time in the production of a parison of the 3/5/3 layer structure. Each of these figures shows the state at the end of the series of the steps I to IV. Dotted lines in FIGS. 12 to 14 indicate resin A simultaneously injected with resin B.

The container of this invention can be produced by biaxially stretching the parison obtained by the above method at a temperature of 70° to 130° C. at a stretch ratio of 1 to 4 in the axial direction and 2 to 7 in the circumferential direction and at an area ratio of 5 to 15. The suitable blowing pressure is 10 to 40 kg/cm$^2$, preferably 20 to 35 kg/cm$^2$. The suitable thickness of the container is 200 to 500 microns, preferably 250 to 450 microns.

Examples of resin A used in this invention include thermoplastic polyester resins, polyolefin resins, polycarbonates, polyacrylonitrile, polyvinyl chloride and polystyrene. The thermoplastic polyester resins are preferred.

Examples of resin B used in this invention, i.e. the thermoplastic gas-barrier resin, include MX nylon, a saponification product of ethylene/vinyl acetate copolymer resin, polyacrylonitrile copolymer resin and polyvinylidene chloride resin. MX nylon is preferred.

A combination of MX nylon with a thermoplastic polyester resin, especially polyethylene terephthalate, is especially preferred because it gives excellent transparency, mechanical strength, injection-moldability and stretch blow-moldability.

The thermoplastic polyester resins denote polyesters derived from an acid component at least 80 mole %, preferably at least 90 mole %, of which consists of terephthalic acid and a glycol component at least 80 mole %, preferably at least 90 mole %, of which consists of ethylene glycol. The remainder of the acid component may comprise, for example, isophthalate, diphenyl ether-4,4-dicarboxylic acid, naphthalene-1,4-(or 2,6)dicarboxylic acid, adipic acid, sebacic acid, decane-1,10-dicarboxylic acid or hexahydroterephthalic acid. The remainder of the glycol component may comprise, for example, propylene glycol, 1,4-butanediol, neopentyl glycol, diethylene glycol, cyclohexanedimethanol, 2,2-bis(4-hydroxyphenyl)propane, and 2,2-bis(4-hydroxyethoxyphenyl)propane. Polyester resins which also contain a hydroxycarboxylic acid component such as p-hydroxybenzoic acid may also be used.

The suitable intrinsic viscosity of the thermoplastic polyester resins is at least 0.55, preferably 0.65 to 1.4. If the intrinsic viscosity is less than 0.55, it is difficult to obtain a transparent amorphous multilayered parison, and a container formed from the resulting parison has insufficient mechanical strength.

MX nylon denotes a polymer of m-xylylenediamine alone or a polymer containing at least 70 mole % of structural units derived from a mixed xylylenediamine containing at least 30% of p-xylylenediamine and an alpha, omega-aliphatic dicarboxylic acid having 6 to 10 carbon atoms.

Examples of these polymers include homopolymers such as poly(m-xylylene adipamide), poly(m-xylylene sebacamide) and poly(m-xylylene suberamide); copolymers such as a m-xylylene/p-xylylene adipamide copolymer, a m-xylylene/p-xylylene pimeramide copolymer and a m-xylylene/p-xylylene azelamide copolymer; and copolymers of the components of the above homopolymers and copolymers with aliphatic diamines such as hexamethylenediamine, alicyclic diamines such as piperazine, aromatic diamines such as p-bis(2-aminoethyl)benzene, aromatic dicarboxylic acids such as terephthalic acid, lactams such as epsilon-caprolactam, omega-aminocarboxylic acids such as omega-aminoheptanoic acid, or aromatic aminocarboxylic carboxylic acids such as p-aminobenzoic acid.

These polymers may include such polymers as nylon 6, nylon 66, nylon 610 and nylon 11.

These MX nylon resins suitably have a relative viscosity of at least 1.5, preferably 2.0 to 4.0.

In the present invention, a coloring agent, an ultraviolet absorber, an antistatic agent, an antioxidant, a lubricant, a nucleating agent, etc. may be incorporated into one or both of resins A and B in amounts which do not impair the object of the invention.

The layer structure of the multilayered container of this invention conforms to the desired shape of the container. It is free from delamination between resin layers and has excellent gas-barrier property. The process of this invention can easily produce their multilayered container having the aforesaid structure.

The following Examples and Comparative Examples illustrate the present invention in greater detail.

The various properties shown in these examples were measured by the following methods.

(1) Intrinsic viscosity [$\eta$] of the polyester resin

Measured at a temperature of 30° C. in a 6:4 (by weight) mixture of phenol and tetrachloroethane.

(2) Relative viscosity [$\eta_{rel}$] of the polyamide resin

Measured at a temperature of 25° C. using a solution of 1 g of the resin in 100 ml of 96% sulfuric acid.

(3) Oxygen permeability

Measured by using OXTRAN 100 made by Modern Control Inc.) at a temperature of 20° C., an inside relative humidity of 100% and an outside relative humidity of 65%.

(4) Carbon dioxide escaping test

Carbonated water (4 gas volume) was filled in a container and stored at a temperature of 22° C. and a relative humidity of 60%. The amount of carbon dioxide gas escaped was meaured by a pressure gauge 12 weeks later. The gas volume were calculated from the pressure in accordance with the table of carbon dioxide absorption coefficients.

(5) Test for delamination due to gas pressure

Water at 2° to 4° C. was put in a container and filled to a predetermined depth. The container was sealed up with a cap having a rubber septum. The container was pressurized with nitrogen gas to a pressure of 7 kg/cm² for 1 minute, and the occurrence of delamination between resin layers was examined.

EXAMPLE 1

Polyethylene terephthalate having an intrinsic viscosity of 0.75 was used as resin A, and poly(m-xylylene adipamide) having a relative viscosity of 2.1 was used as resin B. By using the device shown in FIG. 7, a parison was formed which had an outside diameter of 30 mm, a length of 120 mm, a thickness of 4 mm, a weight of 50 g and an inner capacity of about 47 cc.

The amounts of resins A and B injected and the injection speeds were as indicated in Table 1. The temperature conditions were as follows:

Injection cylinder for resin A: 270° C.
Injection cylinder for resin B: 260° C.
Resin flow passage within the mold: 270° C.
Mold cooling water: 15° C.

The parison was heated to 95° C. by an infrared heater and biaxially stretched blow-molded under a blow pressure of 20 kg/cm²-G to produce a container having the shape shown in FIG. 1. In the same way, a container having the shape shown in FIG. 2 was produced. Both of the containers had a capacity of 1,500 ml, an outside diameter of 90 mm and a height of 300 mm. The bent portions of the containers were as follows:

FIG. 1
Vertical rib: depth 1.0 mm, radius of curvature 1.2 mm
Lateral rib: depth 2.0 mm, radius of curvature 1.8 mm
FIG. 2
Vertical rib: depth 1.2 mm, radius of curvature 1.0 mm
Lateral rib: depth 1.75 mm, radius of curvature 2.0 mm The two containers were subjected to the measurement of oxygen permeability, the test for carbon dioxide gas escaping (only the container having the shape shown in FIG. 2) and the test for delamination (only the container having the shape shown in FIG. 2). The results were good as shown in Table 2 for Examples 1-1 and 1-2.

EXAMPLES 2 TO 6 AND COMPARATIVE EXAMPLES 1 TO 7

In each run, a parison was formed by injection molding in the same way as in Example 1 except that the amounts of resins A and B injected and the speeds of injection in steps I to step IV were changed as indicated in Table 1. The parison had the layer structure shown in Table 1.

The parisons obtained in Examples 2 and 3 and Comparative Examples 1 and 2 were each stretch blow-molded as in Example 1 to produce containers having the shapes shown in FIGS. 1 and 2.

Eight types of the containers so obtained were each subjected to the measurement of oxygen permeability, the test for carbon dioxide gas escaping (only the containers having the shape shown in FIG. 2) and the test for delamination (only the containers having the shape shown in FIG. 2).

The results are shown in Table 2 for Examples 2-1, 2-2, 3-1 and 3-2, and Comparative Examples 1-1, 1-2, 2-1 and 2-2.

In Comparative Example 1-2, the result of the carbon dioxide escaping test was good because the container had a five-layer structure, but in the delamination test, delamination occurred at the vertical rib portion in 48 samples out of 50 samples. On the other hand, in Comparative Example 2-2, no delamination occurred in the delamination test because the container had a three-layer structure, but the result of the carbon dioxide gas escaping test was not satisfactory. t,0200 t,0220

We claim:

1. A biaxially oriented blow-molded container composed of a thermoplastic gas-barrier resin (resin B) and a thermoplastic resin (resin A) other than resin B and comprising
a substantially non-oriented mouth portion composed of resin A, and
the remainder consisting of (1) a portion composed of two layers of resin A and one layer of resin B which are laminated with the resin A layer and the resin B layer occurring alternately, (2) a portion composed of three layers of resin A and two layers of resin B which are laminated with the resin A layer and the resin B layer occurring alternately, and (3) a portion composed of two layers of resin A and one layer of resin B which are laminated with the resin A layer and the resin B layer occurring alternately, the portions (1), (2) and (3) extending in this order toward the bottom of the container.

2. A biaxially oriented blow-molded container composed of a thermoplastic gas-barrier resin (resin B) and a thermoplastic resin (resin A) other than resin B and comprising
a substantially non-oriented mouth portion composed of resin A, and
the remainder consisting of (1) a portion composed of two layers of resin A and one layer of resin B which are laminated with the resin A layer and the resin B layer occurring alternately and (2) a portion composed of three layers of resin A and two layers of resin B which are laminated with the resin A layer and the resin B layer occurring alternately, the portions (1) and (2) extending in this order toward the bottom of the container.

3. A biaxially oriented blow-molded container composed of a thermoplastic gas-barrier resin (resin B) and a thermoplastic resin (resin A) other than resin B and comprising
a substantially non-oriented mouth portion composed of resin A, and
the remainder consisting of (1) a portion composed of three layers of resin A and two layers of resin B which are laminated with the resin A layer and the resin B layer occurring alternately, and (2) a portion composed of two layers of resin A and one layer of resin B which are laminated with the resin A layer and the resin B layer occurring alternately, the portions (1) and (2) extending in this order toward the bottom of the container.

4. A process for producing a biaxially oriented blow-molded container composed of a thermoplastic gas-barrier resin (resin B) and a thermoplastic resin (resin A) other than resin B and comprising
a substantially non-oriented mouth portion composed of resin A, and the remainder consisting of (1) a portion composed of two layers of resin A and one layer of resin B which are laminated with the resin A layer and the resin B layer occurring alternately, (2) a portion composed of three layers of resin A and two layers of resin B which are laminated with the resin A layer and the resin B layer occurring alternately, and (3) a portion composed of two layers of resin A and one layer of resin B which are laminated with the resin A layer and the resin B layer occurring alternately, the portions (1), (2) and (3) extending in this order toward the bottom of the container; which comprises injecting resins A and B into a mold cavity to form a parison, and thereafter stretch blow-molding the parison, wherein the parison is formed by adjusting the total amount of resin B to be injected to 1 to 25% of the volume of the mold cavity, and (a) injecting resin A alone in an amount corresponding to 20 to 70% of the volume of the cavity, (b) simultaneously injecting resin B in an amount corresponding to 5 to 35% by weight of the total amount of resin B to be injected and resin A in an amount 1.0 to 10 times the amount of the resin B to be injected in this step, (c) injecting resin B in an amount corresponding to 30 to 90% of the total amount of resin B to be injected either alone or together with resin A in an amount not more than 2 times the amount of resin B to be injected in this step, (d) simultaneously injecting resin B in an amount corresponding to 5 to 35% of the total amount of resin B injected and resin A in an amount 1.0 to 10 times the amount of resin B to be injected in this step, and (e) finally injecting resin A alone in an amount corresponding to 10 to 70% of the volume of the cavity to fill the cavity.

5. A process for producing a biaxially oriented blow-molded container composed of a thermoplastic gas-barrier resin (resin B) and a thermoplastic resin (resin A) other than resin B and comprising a substantially non-oriented mouth portion composed of resin A, and the remainder consisting of (1) a portion composed of two layers of resin A and one layer of resin B which are laminated with the resin A layer and the resin B layer occurring alternately and (2) a portion composed of three layers of resin A and two layers of resin B which are laminated with the resin A layer and the resin B layer occurring alternately, the portions (1) and (2) extending in this order toward the bottom of the container; which comprises injecting resins A and B into a mold cavity to form a parison, and thereafter stretch blow-molding the parison, wherein the parison is formed by adjusting the total amount of resin B to be injected to 1 to 25% of the volume of the mold cavity, and (a) injecting resin A alone in an amount corresponding to 20 to 70% of the volume of the cavity, (b) simultaneously injecting resin B in an amount corresponding to 10 to 70% by weight of the total amount of resin B to be injected and resin A in an amount 1.0 to 10 times the amount of the resin B to be injected in this step, (c) injecting resin B in an amount corresponding to 30 to 90% of the total amount of resin B to be injected either alone or together wtih resin A in an amount not more than 2 times the amount of resin B to be injected in this step, (d) finally injecting resin A alone in an amount corresponding to 10 to 70% of the volume of the cavity to fill the cavity.

6. A process for producing a biaxially oriented blow-molded container composed of a thermoplastic gas-barrier resin (resin B) and a thermoplastic resin (resin A) other than resin B and comprising a substantially non-oriented mouth portion composed of resin A, and the remainder consisting of (1) a portion composed of three layers of resin A and two layers of resin B which are laminated with the resin A layer and the resin B layer occurring alternately, and (2) a portion composed of two layers of resin A and one layer of resin B which are laminated with the resin A layer and the resin B layer occurring alternately, the portions (1) and (2) extending in this order toward the bottom of the container; which comprises injecting resins A and B into a mold cavity to form a parison, and thereafter stretch blow-molding the parison. wherein the parison is formed by adjusting the total amount of resin B to be injected to 1 to 25% of the volume of the mold cavity, and (a) injecting resin A alone in an amount corresponding to 20 to 70% of the volume of the cavity, (b) injecting resin B in an amount corresponding to 30 to 90% of the total amount of resin B to be injected either alone or together with resin A in an amount not more than 2 times the amount of resin B to be injected in this step, (c) simultaneously injecting resin B in an amount corresponding to 10 to 70% of the total amount of resin B injected and resin A in an amount 1.0 to 10 times the amount of resin B to be injected in this step, and (d) finally injecting resin A alone in an amount corresponding to 10 to 70% of the volume of the cavity to fill the cavity.

7. A biaxially oriented blow-molded container composed of a thermoplastic gas-barrier resin (resin B) and thermoplastic resin (resin A) other than resin A, and comprising (a) a substantially non-oriented mouth portion composed of resin A, (b) a biaxially oriented portion composed of three layers of resin A and two layers of resin B which are laminated with the resin A layer and the resin B layer occurring alternately, and (c) a biaxially oriented bent portion containing a rib part having a radius of curvature of not more than 5 mm and being composed of two layers of resin A and one layer of resin B which are laminated with the resin A layer and the resin B layer occurring alternately.

* * * * *